(12) United States Patent
Fortuna, Jr.

(10) Patent No.: US 7,624,093 B2
(45) Date of Patent: Nov. 24, 2009

(54) METHOD AND SYSTEM FOR AUTOMATIC SUMMARIZATION AND DIGEST OF CELEBRITY NEWS

(75) Inventor: Joseph A. Fortuna, Jr., Lake Huntington, NY (US)

(73) Assignee: Fameball, Inc., Cold Spring, NY (US)

( * ) Notice: Subject to any disclaimer, the term of this patent is extended or adjusted under 35 U.S.C. 154(b) by 344 days.

(21) Appl. No.: 11/698,018

(22) Filed: Jan. 25, 2007

(65) Prior Publication Data

US 2007/0174343 A1 Jul. 26, 2007

Related U.S. Application Data

(60) Provisional application No. 60/762,083, filed on Jan. 25, 2006.

(51) Int. Cl.
*G06F 7/00* (2006.01)

(52) U.S. Cl. .............................................. 707/1; 707/3
(58) Field of Classification Search .................. 707/1–7; 705/14
See application file for complete search history.

(56) References Cited

U.S. PATENT DOCUMENTS

2007/0055656 A1* 3/2007 Tunstall-Pedoe ............... 707/3
2007/0078717 A1* 4/2007 Ho et al. ....................... 705/14

\* cited by examiner

*Primary Examiner*—Wilson Lee
(74) *Attorney, Agent, or Firm*—Whiteford, Taylor & Preston L.L.P.

(57) ABSTRACT

A system and method for automatically creating a digest of celebrity information received over an adjustable time range from publicly available electronic data sources by applying automated qualitative and quantitative analytical methods to select information for inclusion in the digest and to convert such information to summary form.

4 Claims, 3 Drawing Sheets

METHOD AND SYSTEM FOR AUTOMATIC SUMMARIZATION AND DIGEST OF CELEBRITY NEWS

CROSS REFERENCE TO RELATED APPLICATION

This application is based upon and claims benefit of U.S. Provisional Patent Application Ser. No. 60/762,083, filed with the U.S. Patent and Trademark Office on Jan. 25, 2006 by the inventor herein, the specification of which is incorporated herein by reference.

BACKGROUND OF THE INVENTION

1. Field of the Invention

This invention relates to a system and method for collecting and summarizing celebrity-related news, and more particularly to a system and method for automatically creating a digest of celebrity information received over an adjustable time range from publicly available electronic data sources by applying automated qualitative and quantitative analytical methods to select information for inclusion in the digest and to convert such information to summary form.

2. Background

Since well before today's thriving entertainment industry, celebrity news has been a part of the world media landscape. Tabloid newspapers, magazines, entertainment reporting television programs, and even mainstream news programs report on celebrity issues to a vast audience, with new television programs, print media, and other sources with a celebrity news focus becoming available each month. Moreover, the growth of electronic media available over the internet and the portability of data have increased demand for such information, which increased demand has led to growth of the corpus of available celebrity information. For those interested in following celebrity news, the crowding of the marketplace with so many sources of celebrity information can make it difficult to find the particular pieces of celebrity information a reader is interested in. Such celebrity news is typically compiled by hand and presented to readers in an ever-widening array of formats ranging from simple tickers along the bottom of a screen to comic book like tabloids. Unfortunately, to date, there are no systems available to effectively and automatically summarize such a barrage of information into a usable form for a typical reader.

SUMMARY OF THE INVENTION

It would be advantageous to create an effective system and method for the comprehensive, periodic summarization of celebrity news.

Disclosed is a collection of computer programs that generates a corpus of information that may be of continuously increasing size, using as its source the wealth of celebrity information available in electronic form, such as information available on the Internet. This information typically takes the form of public news feeds being released by traditional news media outlets, public relations firms, and private citizens. Much of this information is published in RSS (Really Simple Syndication) format, an open standard on the Internet, which is rapidly becoming the default protocol for news syndication. RSS is a family of web feed formats used to publish frequently updated pages, such as blogs or news feeds. From this news, the system is designed to output a summary of information about particular celebrities that can be limited to a specific time period.

The information in the database preferably includes celebrity specific data and statistics, as well as a growing corpus of news data taken from the above-mentioned sources. The database is preferably both automatically maintained and hand-edited by a human.

The system may perform a combination of word-stemming, TD/IDF analysis, and N-gram analysis to identify pertinent sentences and data points and to tag those data points for extraction and inclusion in the summary. Sentiment analysis is also preferably performed on a per-summary basis, which provides a general qualitative indication of the news being summarized.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF EXEMPLARY EMBODIMENTS

The invention summarized above and defined by the enumerated claims may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In a particularly preferred embodiment of the invention, the system (and the method employed by such system) divides its functions into four major functional components: Database Generation, Summarization, Sentiment Analysis, and Presentation. Subject to the nature of the request made by a user, each process can be asynchronous to every other, or several processes can follow on one another as dependencies. Each case is described below.

Figure 1:
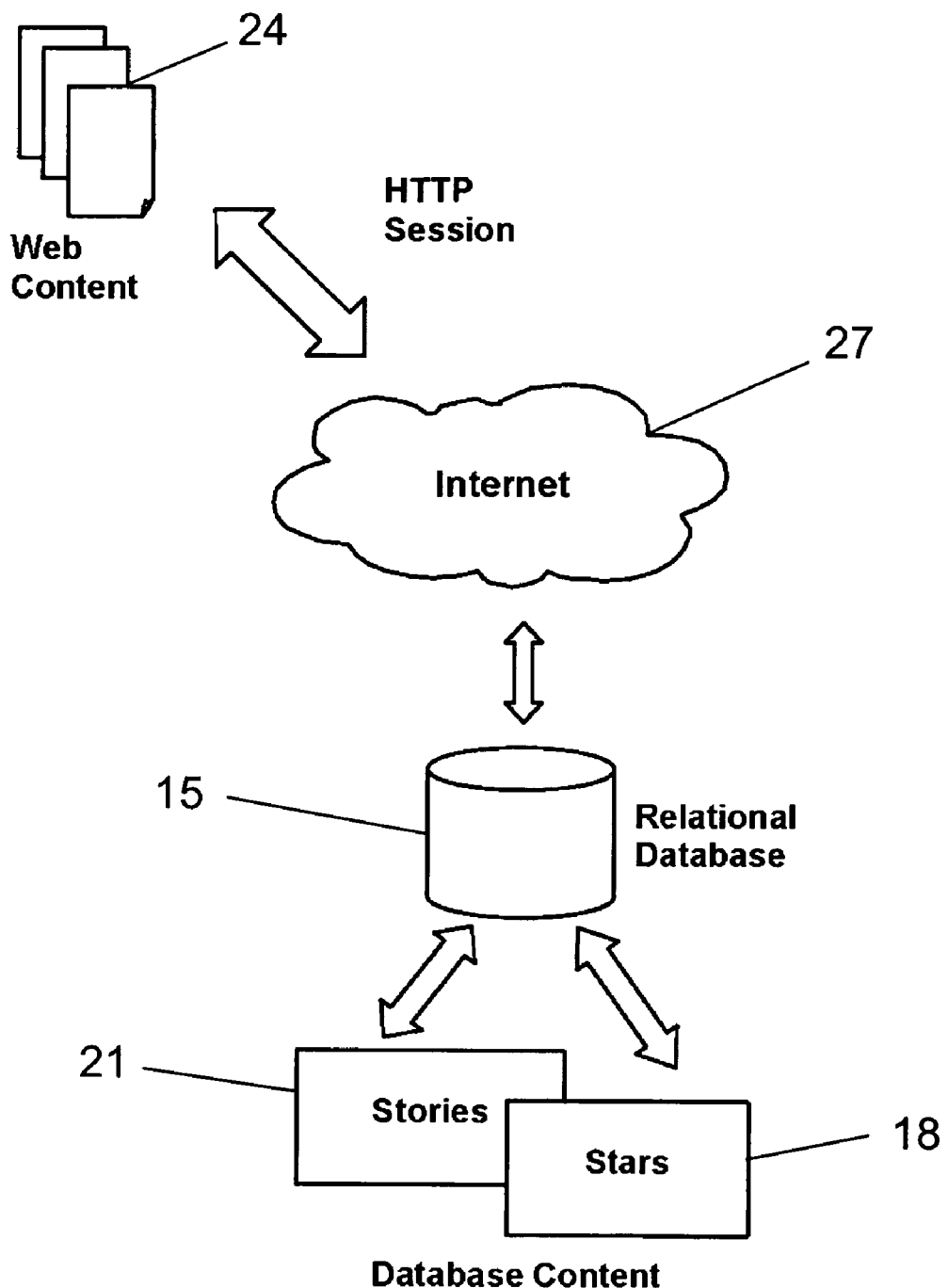
FIG. 1 is a block diagram showing database generation according to a first embodiment of the present invention.

Database Generation As shown in FIG. 1, the system uses a relational database structure for organization of collected data. The major tables of information in the relational database 15 are preferably: Stories, Stars, FameTypes (categories of celebrity), StarTypes (many to many mapping between Stars and FameTypes), and StarStories (a many to many mapping between Stars and Stories). The Stars table 18 preferably contains personal data specific to each celebrity (name, gender, age, etc.). The Stories table 21 preferably table contains celebrity-related news and information gathered by a Data Generation process, described in more detail below. Stories are formatted to preferably include date, story title, story source, story abstract, and story text. Additional fields preferably include story-specific photo file, duration of chat (if information is harvested by a chat bot, as described below), and reply count (if information is harvested from a message board).

The StarStories table may include fields for both StoryId and StarId, as well as fields that indicate whether a given story is considered a "Strong Match" for a given star. A strong match is determined by a combination of frequency of mention of the celebrity, whether the celebrity is listed (included in a comma-delimited list of other celebrities) or referred to explicitly, and the occurrence of the celebrity's name in any available title.

Within the text of a story, celebrity names are tagged, in standard XML format as <PERSON>. Names may be identified in a number of ways. In several formats (particularly those harvested from deeplinks identified in RSS feeds provided by formal news outlets) celebrity names may be encased in very easily identifiable blocks of JavaScript, or clearly labeled DOM elements (e.g., classnames for<div>elements). Using this method, and through hand editing and accumulation, the system relies on a celebrity database—a list of names known to be celebrities. This list is amended on an ongoing basis, both by the application and by the application's engineers.

In the absence of both specific HTML indicators and recognition of a learned name, names are extracted by regular expression pattern matching. Specifically, matching against the following pattern: "\\s([A-Z][a-z]+[A-Z][a-z][a-zA-Z][a-z]+([A-Z][a-z]+)?" A further refinement to pattern matching includes verb parsing based on syntactically correct placement of a known list of verbs in and around the matched pattern. Verbs are parsed according to conjugated forms as well as lexical stems.

Finally, domain-specific terminology is used to identify celebrity names within a document. Words, such as "diva," "heartthrob," "legend," etc., exist in the database in a separate table and are used to locate sentences within which there is a high likelihood of the presence of a celebrity name.

All of these methods are used in concert—along with hand editing of the results.

Celebrity-related information (the content, or data within which the aforementioned references to celebrities are found) is drawn from a number of sources available as raw web content 24. Most useful are hard news sources from formal outlets, such as AP, Reuters, E! Online, etc. This data is publicly available over the Internet 27 as RSS feeds. Within each feed, on a per-story basis, date, title, and abstract information are specifically tagged, as is a link to a deeper story available on the Internet 27. The system parses these tags, storing the relevant information in the database. Then, using an HTTP GET request, the invention siphons the deeper story, scrubs the extraneous advertising and HTML information, tags the celebrity names, as described above, and stores the deeper content along with the date, title, and abstract in the relational database 15.

Other web content 24 that is available in similar RSS format includes celebrity blogs (web logs maintained by the celebrities themselves), fan blogs (web logs maintained by a celebrity fan base), and general blogs (web logs maintained by otherwise disinterested parties—which may include information about a given celebrity). A list of these feeds is maintained by the system, based on the results of automated web searches, and a WebCrawler designed to pursue related links throughout the Internet 27.

Finally, celebrity data is often released by each celebrity's own public relations firm. Organizations exist (e.g., PR Newswire) that make this information available on a per-story basis in RSS format.

All RSS feeds are preferably acquired using HTTP GET commands, scheduled and automatically launched by the system. As mentioned above, any follow-up requests for deeper content referred to in the feeds are also preferably made via HTTP GET commands. Once acquired, all data is then sifted, scrubbed, tagged, and stored as described above.

Summarization

Figure 2:
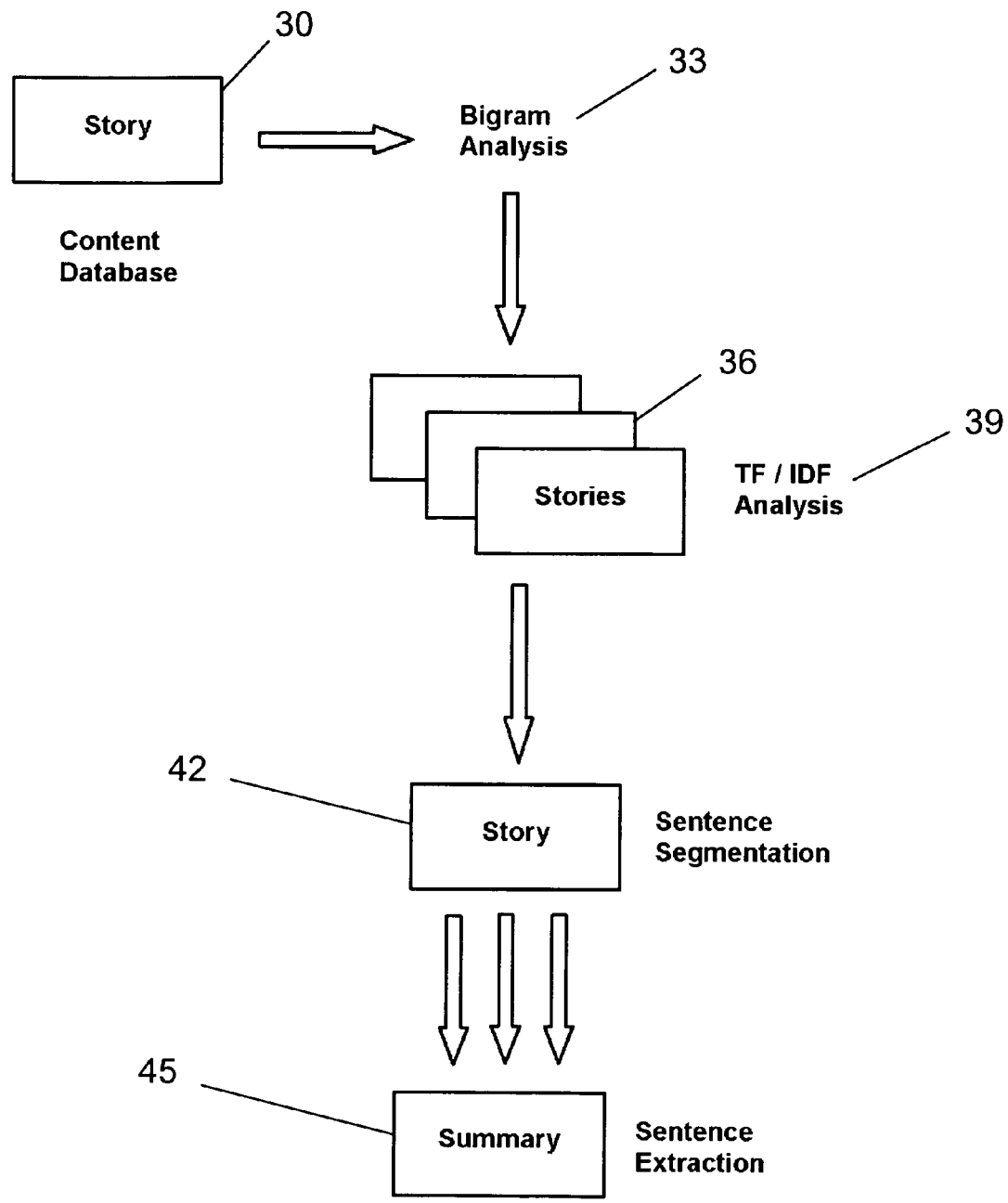
FIG. 2 is a block diagram showing information summarization according to a first embodiment of the present invention.

Referring to FIG. 2, the data involved in these requests is inherently sparse, often consisting of a single story 30 of less than 500 words. Therefore, bigram analysis 33 is preferred as a starting point for summarization. Summarization is preferably executed in time slices (depending on the user's request) and globally (providing general all time summarization per celebrity). The principle difference between the two approaches is the date information. In the former instance, the data is restricted to a range of dates. In the latter instance, all data is analyzed from the first record in the database to the last. For optimization purposes, analysis is scheduled and pre-compiled. The summaries are cached in the database 15 and serve as the basis for future summarization.

To summarize the data for each celebrity, the application first generates a corpus of data 36 formed by the concatenation of all story text associated with the celebrity (again, this may be restricted to a date range, or may be comprehensive). This concatenated corpus is then stripped of all words occurring in a pre-compiled stoplist (incidental words found by humans not to have relational impact on the contextual information). Then, bigrams are generated for the entire corpus and ranked in descending order of frequency.

Each of the bigrams is then passed through a term frequency/inverse document frequency analysis 39 that assigns a weight to the bigram, based on the non-concatenated corpora represented by all stories. The equation for weight assignation is standard:

$$W_{i,j} = tf_{i,j} * \log(N/n_i)$$

That is, the weight of a bigram within a given story is equal to the frequency of occurrence of that term within the story multiplied by the log of the total number of stories divided by the frequency of the bigram within all stories (calculated above).

Sentences containing the top n bigrams (in descending order of weight) are then selected from each story 42 as relevant. The application is designed to keep all quotations intact. Because sentence-like punctuation can result in ambiguity (e.g., "Mr. Jones" ), sentences are disambiguated by regular expression and matching against a known list of punctuated prefixes and acronyms. The application matches against the following pattern: (?<=[a-z]{4,20}[.?!])\"*[\\s+^] and prefixes and acronyms such as "Mr.", "Mrs.", "etc.", "com".

Finally, the application is designed to encourage and incorporate user feedback into its model of summarization. Each element of summary 45 is accompanied by a link that allows the user to request more information, such as that which has been identified as part of the summary. In this way, the application can learn which elements are more pertinent to a given story. Bigrams and sentences are stored and associated with stories and are then used as part of future summarization analysis.

Sentiment Analysis

Figure 3:
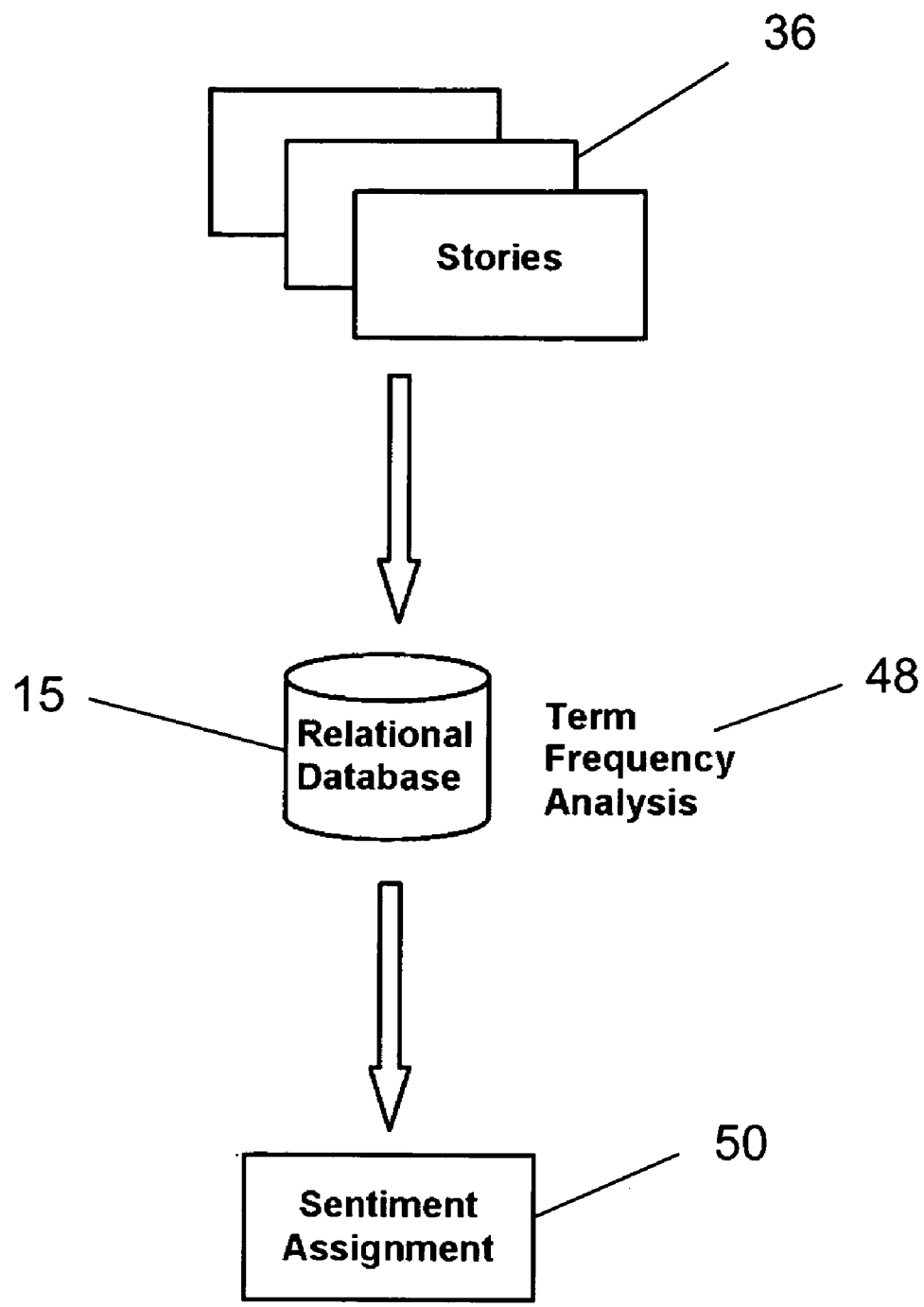
FIG. 3 is a block diagram showing sentiment analysis according to a first embodiment of the present invention.

FIG. 3 illustrates the steps for sentiment analysis. Using the concatenated corpus 36, a further analysis of the general content is preferably executed. Instead of mere summarization of data, a general analysis is given of the quality of information contained in the data. Using Term Frequency Analysis on the data, the text is parsed for verbs, nouns, and adjectives that can be assigned qualitative values. The application maintains an ongoing list of such parts of speech, each of which is given a positive weight and negative weight. Upon completion of the Term Frequency Analysis 48, the sum of all identified weights is taken and a sentiment summary is assigned 50 either positive or negative, based on the resultant sum.

Presentation Given all of the mechanisms mentioned above, and the existence of an underlying relational database, the final presentation of the data can take many forms. In general, the data may be available to a user who accesses a particular website on the Internet. For example, the data may be presented as a series of HTML pages, and summaries may be generated on a daily, weekly, and/or monthly basis. In addition, an "all-time" summary may be given for each celebrity. Such information may be textual, graphic, or combinations of textual and graphic displays.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A method of summarizing information concerning celebrities, comprising a plurality of steps of:
    establishing a relational database for holding such information
    wherein such information contains data selected from the group consisting of:
        name;
        gender; and
        age;
    gathering one or more stories from a plurality of sources;
    parsing the stories to determine specific indicators of one or more celebrities;
    storing said stories in said relational database with appropriate tags to enable retrieval by a user of the database;
    automatically summarizing the stories based on story text for each celebrity; and
    presenting said story summaries for viewing by said user;
    wherein the step of summarizing said stories further comprises a plurality of steps of:
        generating a corpus of data formed by concatenating all story text associated with a selected celebrity;
        stripping predetermined incidental words from said corpus of data;
        generating a plurality of bigrams of the remaining text in the corpus of data;
        performing term frequency-inverse document frequency analysis on the plurality of bigrams;
        assigning a weight value to each bigram; and
        selecting one or more sentences from said corpus of data based on the weighted value of said bigrams.

2. The method of claim 1, wherein said stories are gathered over a global communication network.

3. The method of claim 1, wherein the step of parsing the stories further comprises the steps of:
    tagging each story based on date, title, and abstract information;
    matching patterns in the stories to a predetermined list of known celebrities;
    identifying celebrity names using domain specific terminology;
    identifying keywords in the story indicative of celebrity information.

4. The method of claim 1, further comprising a plurality of steps of:
    generating a corpus of data formed by concatenating all story text associated with a selected celebrity;
    parsing said corpus of data into parts of speech that can be assigned qualitative values;
    assigning a qualitative value to each said part of speech;
    performing term frequency analysis on said corpus of data; and
    assigning a weighted value to said data based on said qualitative values for each part of speech.

* * * * *